United States Patent
Shi et al.

(10) Patent No.: US 7,136,431 B2
(45) Date of Patent: Nov. 14, 2006

(54) DC OFFSET CORRECTING IN A DIRECT CONVERSION OR VERY LOW IF RECEIVER

(75) Inventors: Hong Shi, Redondo Beach, CA (US); Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 758 days.

(21) Appl. No.: 10/279,949

(22) Filed: Oct. 24, 2002

(65) Prior Publication Data

US 2004/0081256 A1 Apr. 29, 2004

(51) Int. Cl.
*H04L 25/06* (2006.01)

(52) U.S. Cl. ............................................ 375/319

(58) Field of Classification Search ............. 375/319, 375/316, 317; 455/325, 324.2; 398/203; 327/306, 307
See application file for complete search history.

(56) References Cited

U.S. PATENT DOCUMENTS

| 6,445,736 | B1* | 9/2002 | Wheeler ..................... 375/235 |
| 6,882,208 | B1* | 4/2005 | Suissa et al. ................ 327/307 |
| 2003/0174641 | A1* | 9/2003 | Rahman ..................... 370/206 |
| 2003/0203728 | A1* | 10/2003 | Filipovic .................. 455/234.2 |
| 2004/0043744 | A1* | 3/2004 | Schlegel et al. ............ 455/324 |

* cited by examiner

*Primary Examiner*—Tesfaldet Bocure
(74) *Attorney, Agent, or Firm*—Garlick Harrison & Markison

(57) ABSTRACT

A direct conversion or VLIF receiver corrects DC offset by, prior to receiving a burst of data, the receiver determines a coarse DC offset with the antenna of the receiver switched off. The receiver then adjusts an analog portion of the receiver (e.g., the output of the mixers) based on the coarse DC offset. The receiver then determines a gain setting of the receiver (e.g., for the low noise amplifier and/or programmable gain amplifiers) with the antenna on. The receiver then sets the gain of at least one gain stage of the receiver based on the gain setting. The receiver then determines a fine DC offset with the antenna off. The receiver then, while receiving a burst of data, subtracts the fine DC offset from the digital baseband or low IF signal prior to data recovery.

26 Claims, 8 Drawing Sheets

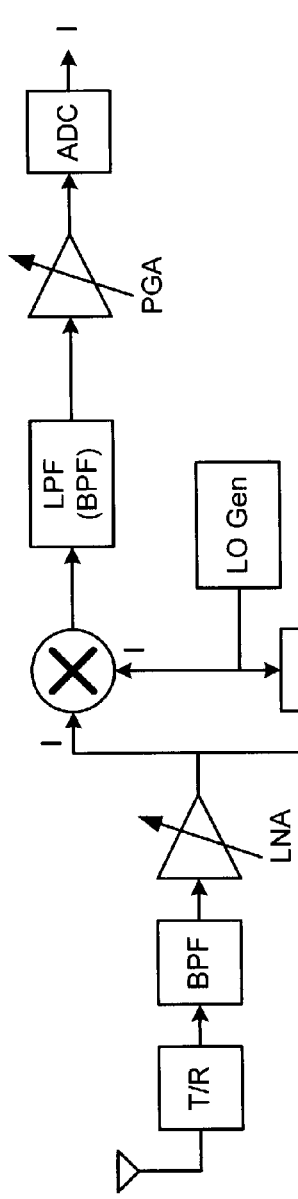
FIG. 1
_Prior Art_
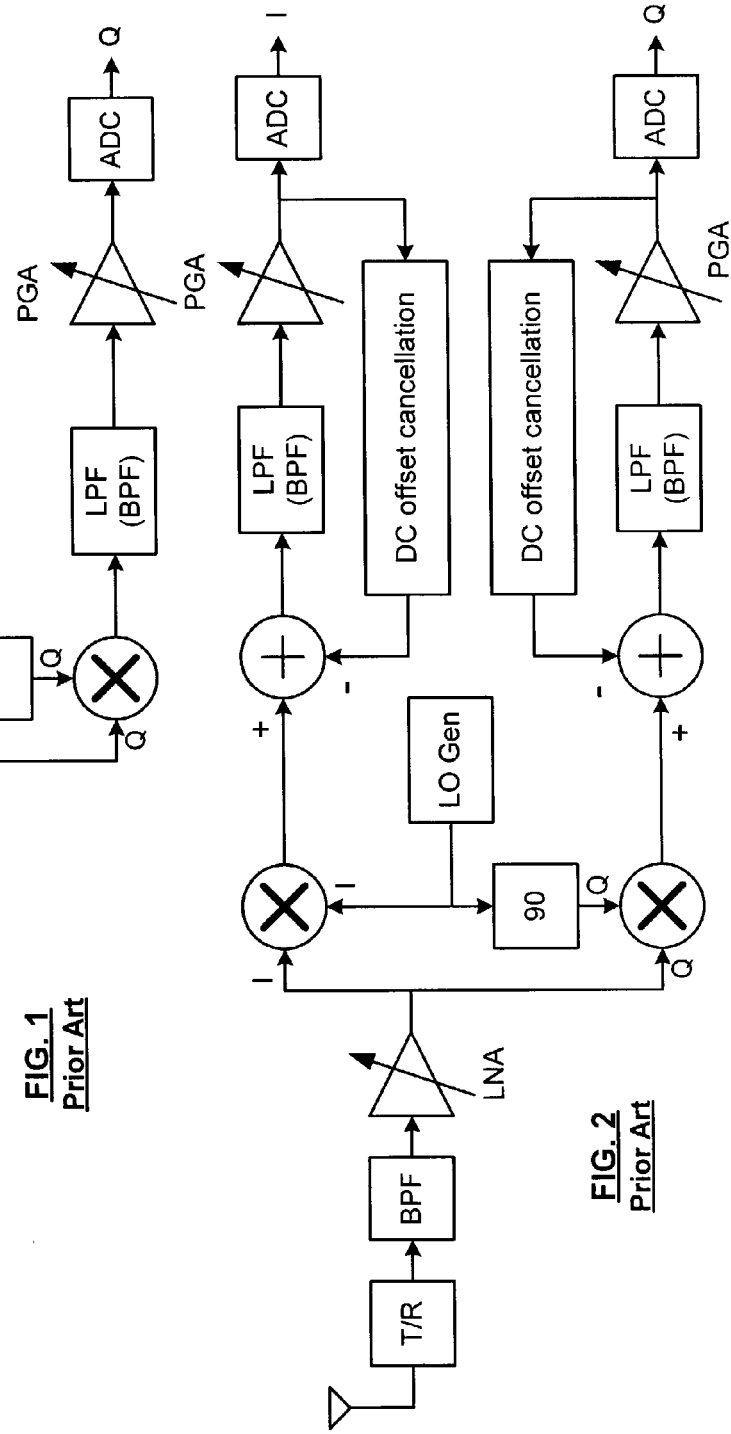
FIG. 2
_Prior Art_ receiver 100

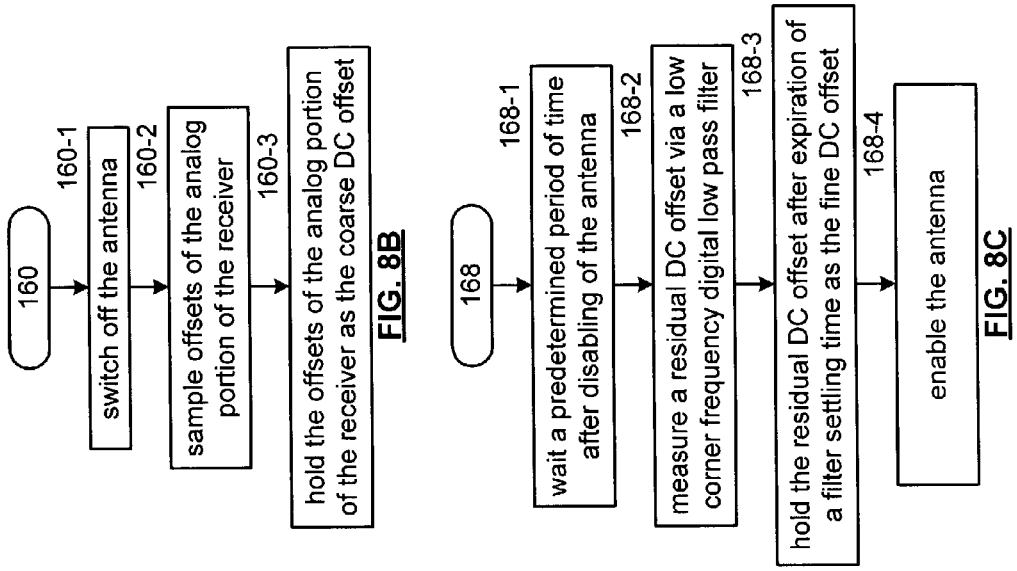
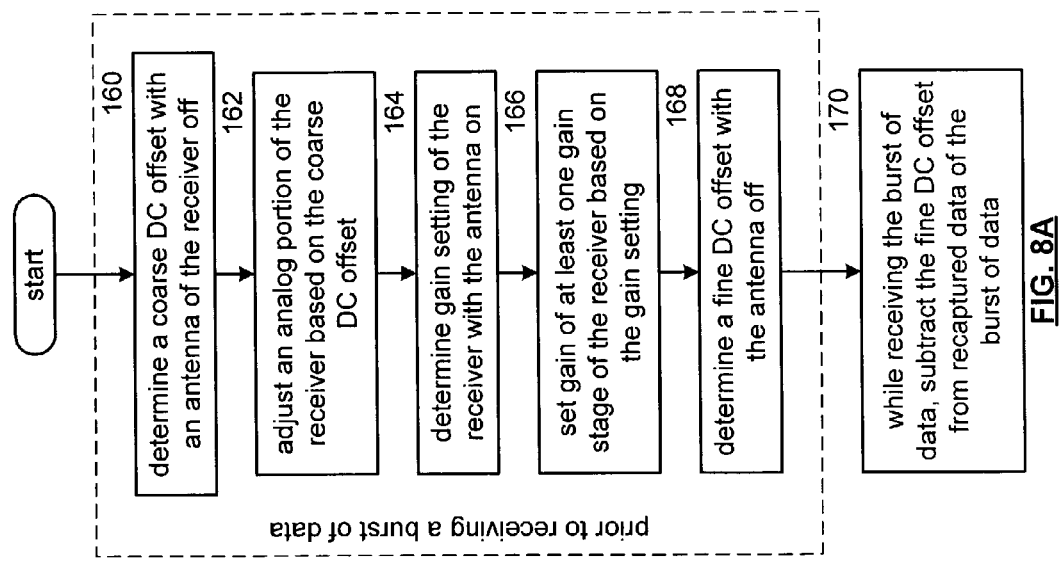

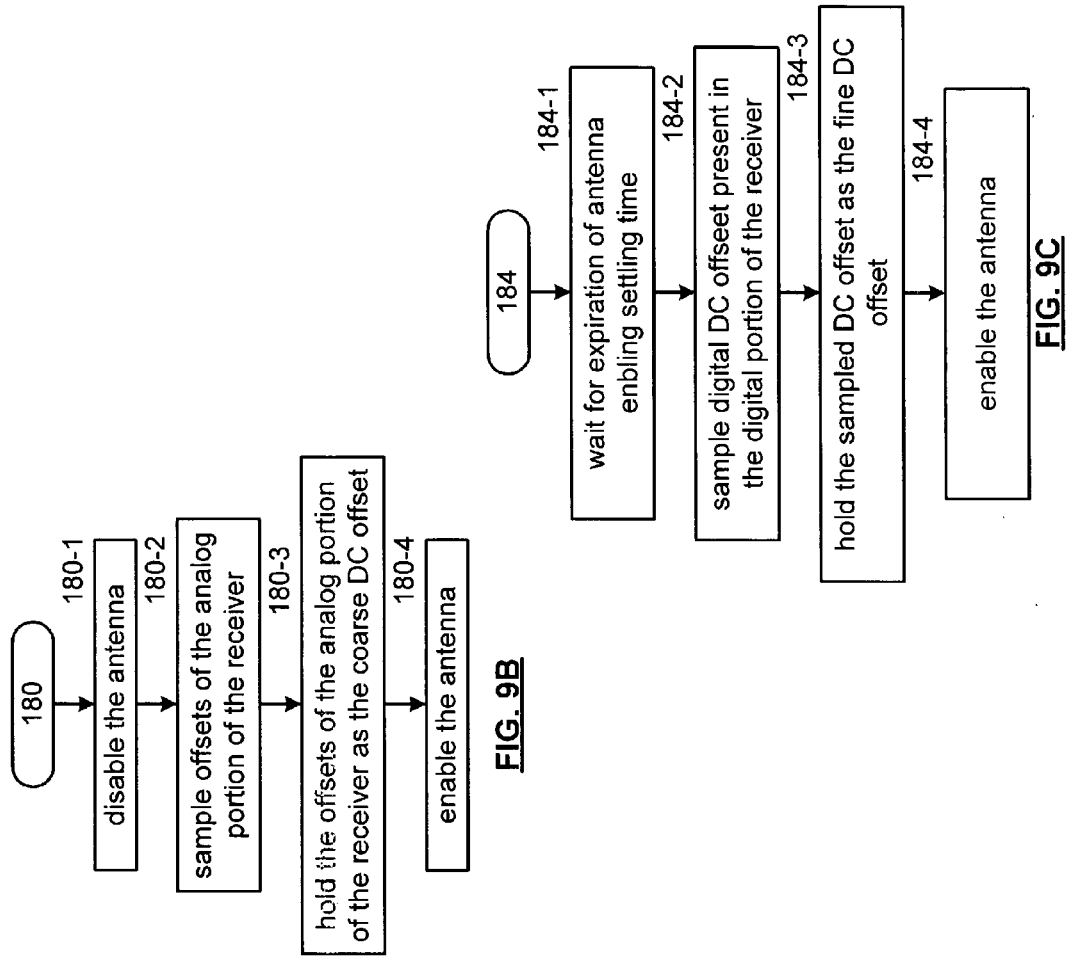
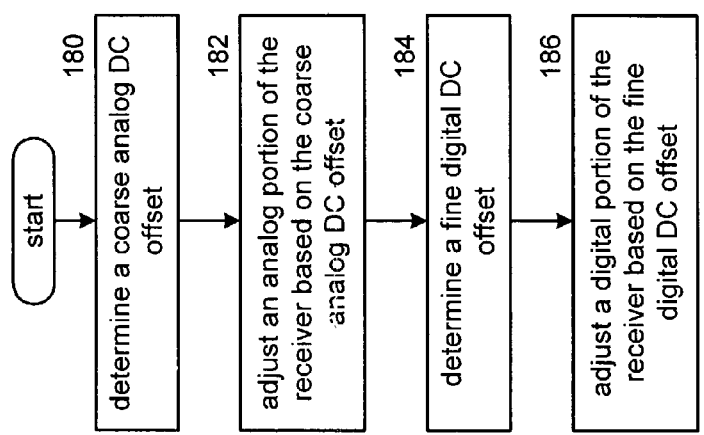

DC OFFSET CORRECTING IN A DIRECT CONVERSION OR VERY LOW IF RECEIVER

BACKGROUND OF THE INVENTION

1. Technical Field of the Invention

This invention relates generally to wireless communication systems and more particularly to wireless receivers used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver may be a prior art direct conversion or very low intermediate frequency (VLIF) receiver as shown in FIG. 1. Such a receiver includes an antenna, transmit receive switch (T/R), a bandpass filter (BPF), low noise amplifier (LNA), local oscillation generator (LO Gen), a pair of mixers, a 90° phase shift module, two low pass filters (LPF) for a direct conversion receiver or two bandpass filters (BPF) for a very low intermediate frequency receiver, two programmable gain amplifiers (PGA), and two analog-digital converters (ADC). The transmit/receive switch (T/R) couples the antenna to the bandpass filter (BPF) to receive incoming radio frequency (RF) signals. The low noise amplifier filters the inbound RF signal and provides a in-phase (I) representation of the RF signal to a $1^{st}$ mixer and a quadrature (Q) representation of the RF signal to a $2^{nd}$ mixer. The $1^{st}$ mixer mixes the in-phase component of the RF signal with an in-phase component of a local oscillation to produce a $1^{st}$ mixed signal. The $2^{nd}$ mixer mixes the quadrature component of the RF signal with a quadrature component of the local oscillator to produce a $2^{nd}$ mixed signal.

For direct conversion receivers, low pass filters (LPF) filter the $1^{st}$ and $2^{nd}$ mixed signals. For a very low intermediate frequency receiver, bandpass filters (BPF) filter the $1^{st}$ and $2^{nd}$ signals. The programmable gain amplifiers (PGA) amplify the filtered signals and provide them to the analog-to-digital converters (ADC). The analog-to-digital converters convert the analog in-phase component into a digital in-phase component at baseband or low intermediate frequency and convert the analog quadrature component at baseband or low IF into a digital quadrature signal.

The direct conversion, or VLIF, receiver of FIG. 1 suffers from DC offset that is caused by self-mixing of the local oscillation in the RF inputs of the $1^{st}$ and $2^{nd}$ mixers and the DC offset generated by the mixer and filter themselves. Such a DC offset produces energy at DC, which for direct conversion and very low IF receivers are in the signal band of interest. If the DC offset is too large with respect to the incoming signal, it dominates the received signal and saturates the following stages (e.g., low pass or bandpass filters, programmable gain amplifier, analog-to-digital converter) or may corrupt the received signal due to degraded Signal-Noise-Ratio (SNR).

One method to reduce DC offset is illustrated in FIG. 2. In this embodiment, the direct conversion, or very low IF, receiver includes an analog DC offset cancellation circuit. As shown, the DC offset cancellation circuit is feed back and subtracted from the incoming mixed signals. To determine the value for the DC offset cancellation circuit, the DC offset is measured during idle times prior to receiving an incoming RF signal. Accordingly, when no RF input signal is being received, and a DC value is present at the output of the programmable gain amplifiers, it is assumed to be created by the self-mixing of the local oscillation within the $1^{st}$ and $2^{nd}$ mixers, impedance mismatch and circuitry DC offset. As such, by measuring this value and then subsequently subtracting it when valid incoming RF signals are being received, the net effect of the DC offset is reduced. However, during the DC offset measuring time, the antenna is switched off to isolate the impact of external interference signals that may induce extra DC offset due to the limited linearities of the components of the receiver. As such, residual DC offset may be present, which, for some sensitive modulation schemes such as EDGE ($3\pi/8$ 8PSK), the residual DC offset is still problematic.

FIGS. 3 and 4 illustrate another method for reducing DC offset in direct conversion, or very low IF, receivers. In this approach, the digital signal processor (DSP) buffers an entire burst of a received RF signal as shown in FIG. 4. From the buffered received signal, the DSP calculates the DC offset by averaging the entire received signal. If no DC offset is present, the average value for the burst of data should be approximately at AC ground (i.e., 0 volts AC). However, if a DC offset exists, the average value will not be at AC ground as illustrated in FIG. 4. Knowing the DC offset, the DSP may adjust the subsequent received bursts of data to accommodate for the DC offset. While this technique reduces DC offset, it also removes the DC component of the incoming RF signal.

Therefore, a need exists for a DC offset cancellation technique that reduces residual DC offsets and avoids removal of the DC component of the incoming signal.

BRIEF SUMMARY OF THE INVENTION

The DC offset correction in a direct conversion or VLIF receiver of the present invention substantially meets these needs and others. In one embodiment of such a receiver, the receiver, prior to receiving a burst of data, determines a coarse DC offset with the antenna of the receiver switched off. The receiver then adjusts an analog portion of the receiver (e.g., the output of the mixers) based on the coarse DC offset. The receiver then determines a gain setting of the receiver (e.g., for the low noise amplifier and/or programmable gain amplifiers) with the antenna on. The receiver then sets the gain of at least one gain stage of the receiver (e.g., the LNA and/or PGAs) based on the gain setting. The receiver then determines a fine DC offset with the antenna off. The receiver then, while receiving a burst of data, subtracts the fine DC offset from the digital baseband or low IF signal prior to data recovery. By determining coarse and fine DC offset values in accordance with the present invention, residual DC offsets and cancellation of the DC component of received incoming signals are reduced.

In another embodiment of a direct conversion or VLIF receiver, the receiver determines a coarse analog DC offset. The receiver then adjusts an analog portion of the receiver (e.g., the output of the $1^{st}$ and $2^{nd}$ mixers) based on the coarse analog DC offset. The receiver then determines a fine digital DC offset and adjusts a digital portion of the receiver (e.g., the data recovery circuit) based on the fine digital DC offset. Again, by determining a coarse DC offset and a fine DC offset, residual DC offset components and the removal of DC components of the incoming signal are reduced.

BRIEF DESCRIPTION OF THE SEVERAL VIEWS OF THE DRAWINGS

FIG. 1 is a schematic block diagram of a prior art receiver;

FIG. 2 is a schematic block diagram of a prior art receiver including analog DC offset cancellation;

FIGS. 8A–8C illustrate a logic diagram of a method for DC offset correction within a receiver in accordance with the present invention;

FIGS. 9A–9C illustrate a logic diagram of an alternate method for DC offset correction in a receiver in accordance with the present invention.

DETAILED DESCRIPTION OF THE INVENTION

Figures 3, 4:
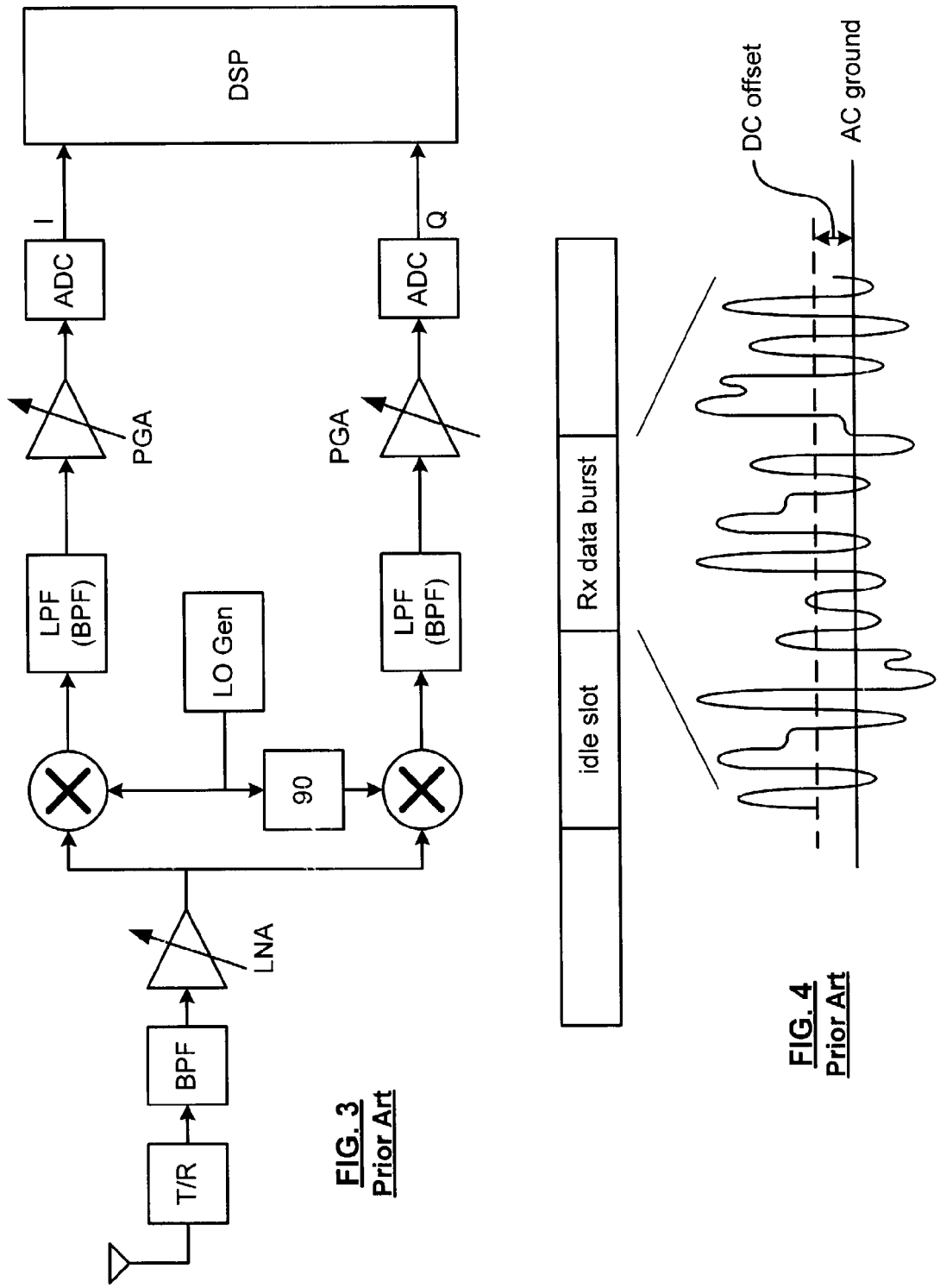
FIGS. 3 and 4 illustrate a receiver including a digital DC offset cancellation.
Figure 5:
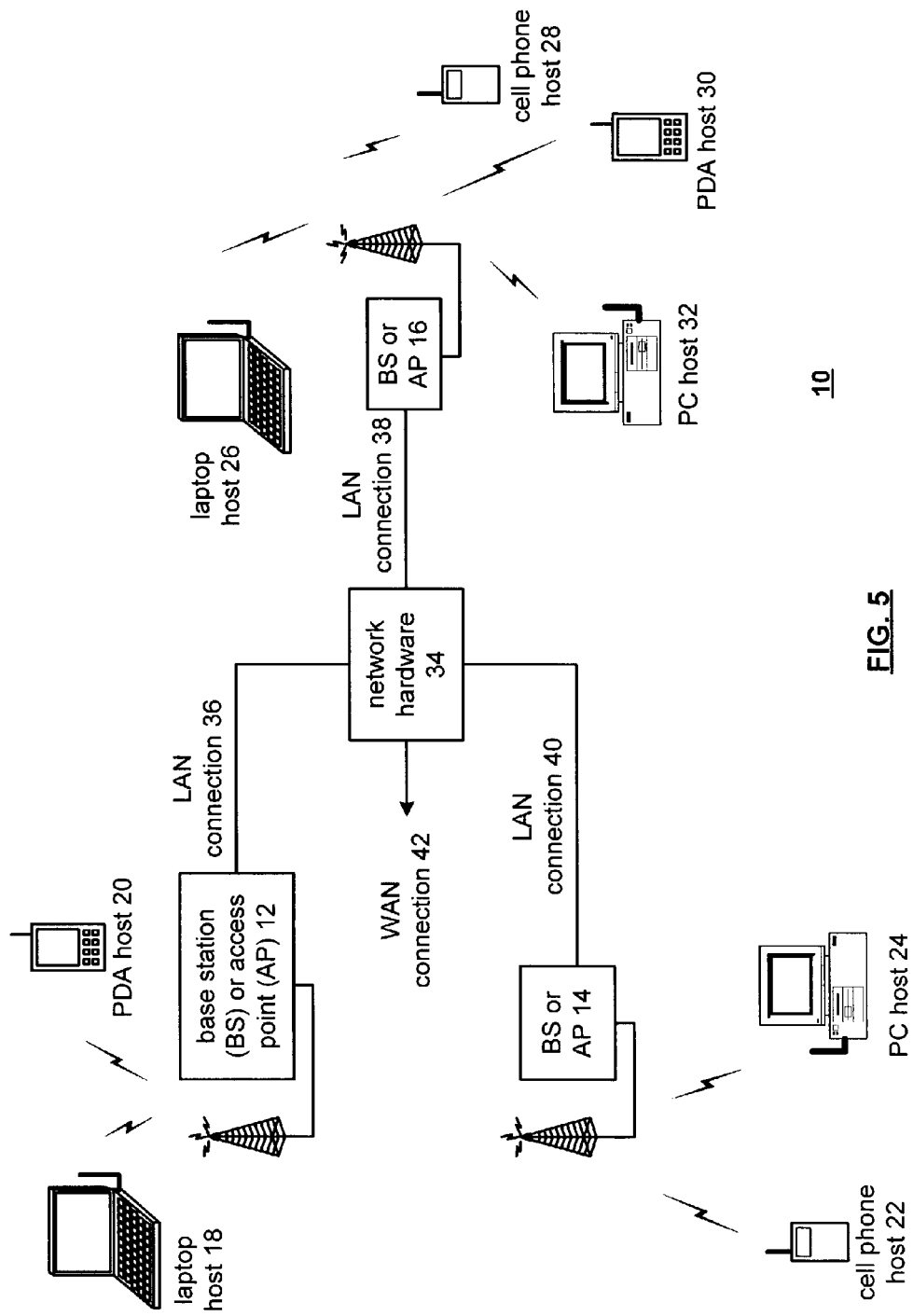
FIG. 5 is a schematic block diagram of a wireless communication system in accordance with the present invention.

FIG. 5 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 6:
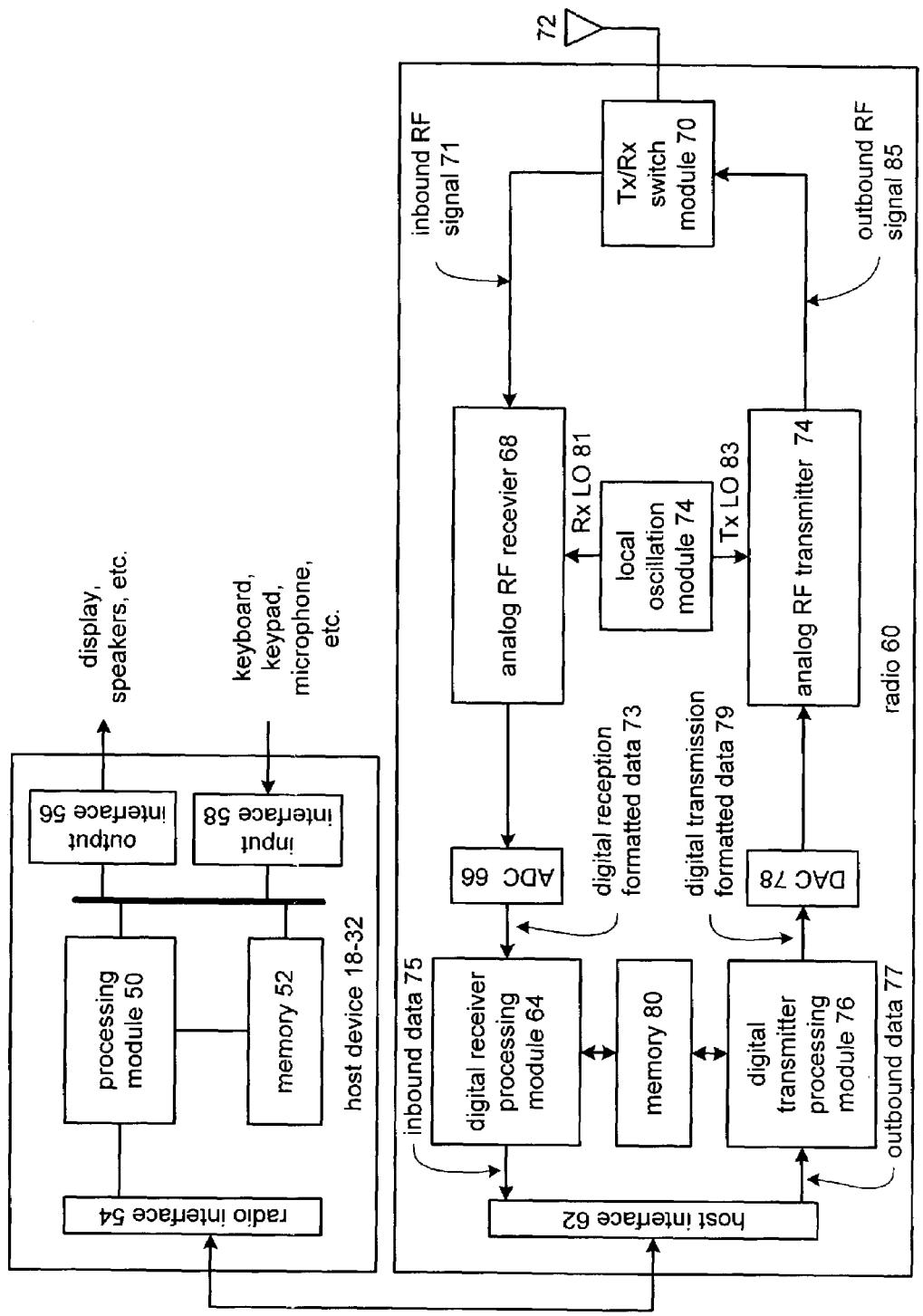
FIG. 6 is a schematic block diagram of a wireless communication device in accordance with the present invention.

FIG. 6 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, an analog RF receiver section 68, a transmitter/receiver switch 73, a local oscillation module 74, memory 80, a digital transmitter processing module 76, a digital-to-analog converter 78, an analog RF transmitter section 74, and an antenna 72. The antenna 72 may be a single antenna that is shared by the transmitter section 74 and the receiver section 68 as regulated by the Tx/Rx switch 73, or may include separate antennas for the transmitter section 74 and receiver section 68. The antenna implementation will depend on the particular standard to which the wireless communication device is compliant.

The digital receiver processing module 64 and the digital transmitter processing module 76, in combination with operational instructions stored in memory 80, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 80 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 77 from the host device via the host interface 62. The host interface 62 routes the outbound data 77 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 79. The digital transmission formatted data 79 will be a digital base-band signal or a digital low IF signal, where the low IF typically will be in the frequency range of one hundred kilohertz to a few megahertz.

The digital-to-analog converter 78 converts the digital transmission formatted data 79 from the digital domain to the analog domain. The analog RF transmitter section 74 converts the baseband or low IF analog signal into an outbound RF signal 85, which is transmitted via the antenna 72 to a targeted device such as a base station, an access point and/or another wireless communication device. In one embodiment, the analog RF transmitter section 74 includes filtering/gain module, an IF mixing stage, and a power amplifier. The filter/gain module filters and/or adjusts the gain of the analog signal received from the DAC 78 and provides the filtered and/or gain adjusted analog signal to the IF mixing stage. The RF mixing stage directly converts the filtered and/or gain adjusted analog signal, which may be an analog baseband signal or analog low IF signal, into an RF signal based on a transmitter local oscillation 83 provided by local oscillation module 74. The power amplifier amplifies the RF signal to produce the outbound RF signal 98, which may be further filtered by a high frequency bandpass filter.

The radio 60 also receives an inbound RF signal 71 via the antenna 72, which was transmitted by a base station, an access point, or another wireless communication device. The antenna 72 provides the inbound RF signal 71 to the analog RF receiver module 68 via the Tx/Rx switch 70. The analog RF receiver module 68, which will described in greater detail with reference to FIGS. 7–10, converts the inbound RF signal 71 into an analog low IF signal or analog baseband signal based on the receiver local oscillation 81. The ADC converts the analog low IF signal or analog baseband signal from the analog domain to the digital domain to produce digital reception formatted data 73. The digital receiver processing module 64 decodes, descrambles, demaps, and/or demodulates the digital reception formatted data 73 to recapture inbound data 75 in accordance with the particular wireless communication standard being implemented by radio 60. The host interface 62 provides the recaptured inbound data 75 to the host device 18–32 via the radio interface 54.

As one of average skill in the art will appreciate, the wireless communication device of FIG. 6 may be implemented using one or more integrated circuits. For example, the host device may be implemented on one integrated circuit, the digital receiver processing module 64, the digital transmitter processing module 76 and memory 80 may be implemented on a second integrated circuit, and the remaining components of the radio 60, less the antenna 72, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 80 may be implemented on a single integrated circuit and/or on the same integrated circuit as the common processing modules of processing module 50 and the digital receiver and transmitter processing module 64 and 76.

Figure 7:
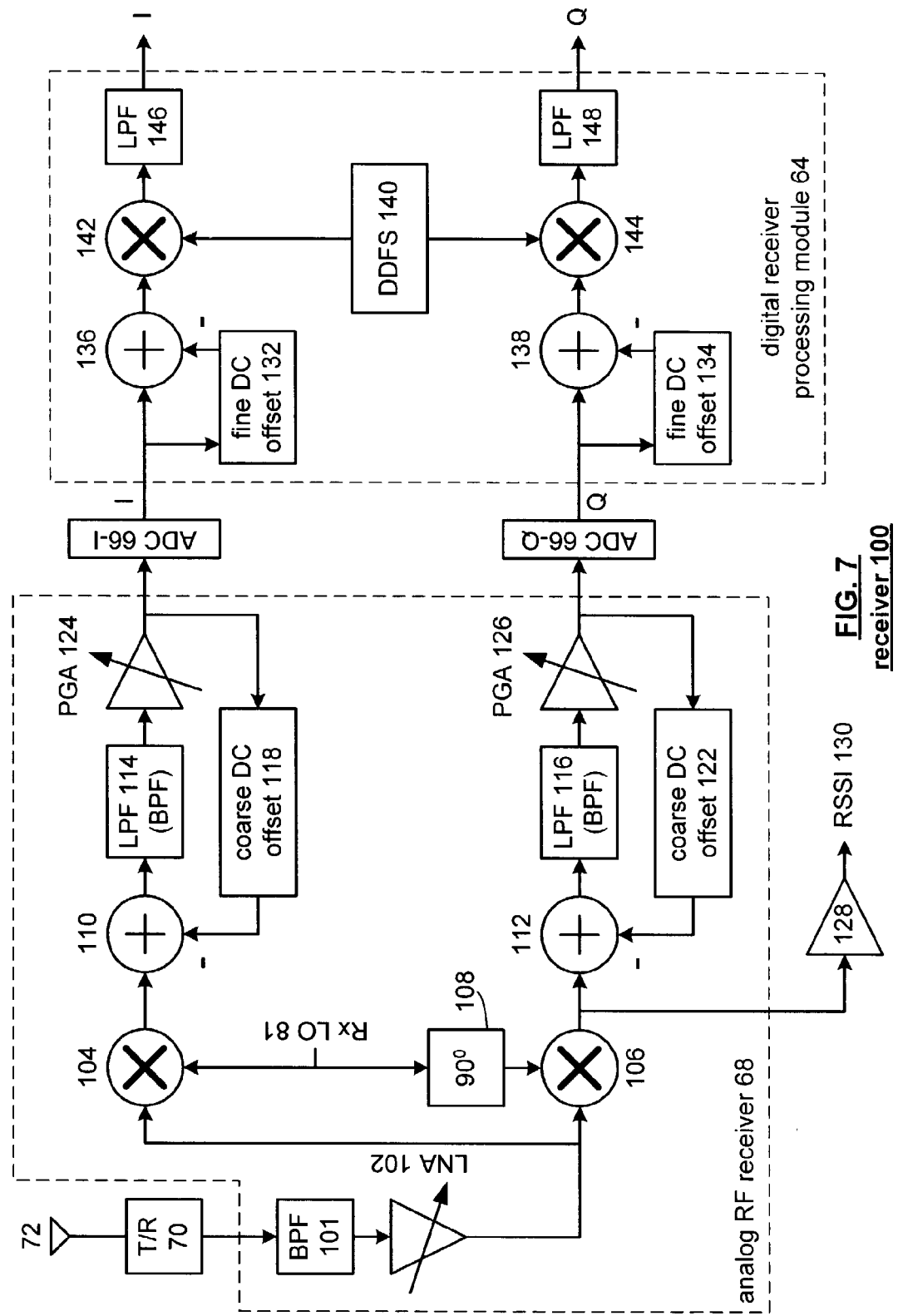
FIG. 7 is a schematic block diagram of a receiver in accordance with the present invention.

FIG. 7 is a schematic block diagram of a receiver 100 that includes an analog RF receiver portion 68, two analog-to-digital converters (ADC) 66-I and 66-Q, and a digital receiver portion 64. The analog receiver portion 68 is operably coupled to the transmit receive switch 70, which in turn is coupled to antenna 72. The analog RF receiver portion 68 includes a bandpass filter 101, low noise amplifier 102, $1^{st}$ and $2^{nd}$ mixers 104 and 106, a 90° phase shift module 108, $1^{st}$ and $2^{nd}$ summation modules 110 and 112, $1^{st}$ and $2^{nd}$ low pass filters, or bandpass filters, 114 and 116, programmable gain amplifiers 124 and 126 and coarse DC offset modules 118 and 122. The digital receiver processing module or digital portion 64, includes fine DC offset modules 132 and 134, summation modules 136 and 138, mixing modules 142 and 144, a direct digital frequency synthesizer (DDFS) 140, and low pass filters 146 and 148.

In operation, the receiver establishes the DC offset for both the coarse DC offset modules 118 and 122 and the fine DC offset modules 132 and 134 during an idle time of the receiver. For example, the idle time of the receiver may correspond to an idle time slot, which proceeds a receive time slot for the radio, in a GSM/EDGE frame. To begin the DC offset calibration process, the receiver, during the idle time, switches the antenna 72 off and sets the gain of the low noise amplifier and programmable gain amplifiers to default values (e.g., at −40 dB). The receiver then starts the analog DC offset control process by measuring the DC values at the outputs of programmable gain amplifiers 124 and 126. In an ideal receiver, since the antenna is off, the inbound RF signal is effectively zero, as such the outputs of the PGAs 124 and 126 should have a zero DC component, however, due to imperfections in the circuitry comprising the receiver, a non-zero DC component exists. These DC values are stored in the coarse DC offsets 11 8 and 122, which may be capacitors or other type of analog circuit that holds a voltage. As one of average skill in the art will appreciate, the DC offset stored in modules 118 and 122 may differ since they are created via different paths within the analog portion of receiver. Once the DC offset values are stored in the offset modules 118 and 122, the receiver enables the antenna.

After waiting a predetermined period of time for the receiver to settle (e.g., 3 microseconds), the receiver sets the gain for the low noise amplifier and programmable gain amplifier. To set the gain, the receiver measures the received signal strength indication (RSSI) 130 from the analog RF receiver portion 68. Based on the measured RSSI 130, a gain setting value for the low noise amplifier 102 and/or the programmable gain amplifier 124 and 126 is determined. Based on this determined gain setting, the gain of the low noise amplifier 102 and/or the gain of the programmable amplifiers 124 and 126 are adjusted. For example, if the RSSI indicates a weak signal strength, the corresponding gains will be increased, if the RSSI indicates a strong signal strength, the corresponding gains will be decreased. At this point, the receiver turns off antenna 72.

After waiting for the receiver to settle (e.g., for approximately 3 microseconds), the receiver begins the digital, or fine, DC offset correction process. With the coarse DC offset already in place, DC offset present at the I and Q inputs of the digital receiver processing module 64 will correspond to residual DC offset. Accordingly, the DC receiver processing module 64 measures the residual DC offset and stores this value in the fine DC offset modules 132 and 134. The fine DC offset modules may include a digital low pass filter and a sample and hold circuit.

With the coarse and fine DC offsets established, the receiver is ready to receive an inbound RF signal. Such an inbound RF signal is received by antenna 72 and provided to bandpass filter 101 via the transmit/receive switch 70. The bandpass filter 101 filters the inbound RF signal and provides it to the low noise amplifier 102. The low noise amplifier 102, based on the previous established gain setting, amplifies the RF signal and provides an in-phase component to mixer 104 and a quadrature component to mixer 106. The mixers 104 and 106 mix their respective components to produce a $1^{st}$ and $2^{nd}$ mixed signal, respectively. The $1^{st}$ and $2^{nd}$ summation modules 110 and 112 subtract the stored coarse DC offsets from the $1^{st}$ and $2^{nd}$ mixed signals prior to filtering by low pass filters 114 and 116. Note that for the low pass filters 114 and 116 are used for direct conversion receivers. For low intermediate frequency receivers, the low pass filters 114 and 116 will be replaced with bandpass filters. Further note that once the coarse DC offset 118 and 122 are established, the connection to the output of programmable gain amplifiers 124 and 126 may be placed in a high impedance state. The programmable gain amplifiers 124 and 126, based on the previously established gain setting, amplify the signals and provide them to the respective analog-to-digital converters, which produces a digital in-phase component and a digital quadrature component.

The digital receiver processing module 64 receives the digital in-phase component and digital quadrature component via summation modules 136 and 138. The summation modules 136 and 138 subtract the stored fine DC offsets from the in-phase and quadrature signals and provides the resultant to the digital mixers 142 and 144. Note that the input to the fine DC offset modules 132 and 134 during the reception of an inbound RF signal may be placed in a high impedance state.

The digital mixers 142 and 144 mix the respective input signals with a low frequency local oscillation generated by the direct digital frequency synthesizer 140. The resulting mixed signals are low pass filtered via 146 and 148 to produce baseband I and Q components of the recovered data.

FIGS. 8A–8C are a logic diagram of a method for DC offset correction in a direct conversion or very low intermediate frequency receiver. The method begins at Step 160 where the receiver determines a coarse DC offset with the antenna of the receiver switched off. This may be done as shown in FIG. 8B where, at Step 160-1, where the receiver switches off the antenna. The process then proceeds to Step 160-2 where the receiver samples DC offsets of the analog portion of the receiver (e.g., analog RF receiver 68 of FIG. 7). This step is generally performed with the gain of the low noise amplifier and gain of the programmable gain amplifiers set at a default gain setting. The process then proceeds to Step 160-3 where the receiver holds the measured DC offsets of the analog portion of the receiver as the coarse DC offset. This may be done by utilizing a capacitor.

Returning to FIG. 8A, the process continues at Step 162 where the receiver adjusts the analog portion of the receiver based on the coarse DC offset. The process then proceeds to Step 164 where the receiver determines a gain setting of the receiver with the antenna on. This may be done by measuring the received signal strength indication (RSSI) with the antenna on and establishing the gain settings based on the RSSI. The process then proceeds to Step 166 where the receiver sets the gain of at least one gain stage of the receiver (e.g., LNA and/or PGAs) based on the gain setting. The process then proceeds to Step 168 where the receiver determines a fine DC offset with the antenna off.

FIG. 8C illustrates how the receiver may determine the fine DC offset. At Step 168-1, the receiver waits a predetermined period of time after disabling the antenna (e.g., approximately 3 microseconds). The process then proceeds to Step 168-2 where the receiver measures a residual DC offset via a low corner frequency digital low pass filter. The process then proceeds to Step 168-3 where the receiver holds the residual DC offset after expiration of a filter settling time as the fine DC offset. The process then proceeds to Step 168-4 where the receiver enables the antenna.

Returning to FIG. 8A, Steps 160–168 are done prior to receiving a burst of data. Accordingly, these steps may be performed during an idle slot, or idle time of the receiver. The process then proceeds to Step 170 where the receiver, while receiving a burst of data, subtracts the fine DC offset from the digital baseband signal or digital low IF signal prior to data recapture.

FIGS. 9A–9C are a logic diagram of an alternate method for DC offset correction in a direct conversion or very low intermediate frequency receiver. The method begins at Step 180 where the receiver determines a coarse analog DC offset. FIG. 9B further illustrates how this may be done. At Step 180-1, the receiver disables the antenna. The method then proceeds to Step 180-2 where the receiver samples DC offsets of the analog portion of the receiver, where the DC offsets are generated by self-mixing of the local oscillation by the $1^{st}$ and $2^{nd}$ mixers. The method then proceeds to Step 180-3 where the receiver holds the DC offset of the analog portion as the coarse DC offset. The method then proceeds to Step 180-4 where the receiver enables the antenna.

Returning to FIG. 9A, the method then proceeds to Step 180-2 where the receiver adjusts the analog portion of the receiver based on the coarse analog DC offset. The process then proceeds to Step 184 where the receiver determines a fine DC offset. This may be done as illustrated in FIG. 9C. At Step 184-1, the receiver waits for expiration of an antenna enabling settling time (e.g., approximately 3 microseconds). The process then proceeds to Step 184-2 where the receiver samples digital DC offset present in the digital portion of the receiver. The process then proceeds to Step 184-3 where the receiver holds the sampled DC offset as the fine DC offset value. The process then proceeds to Step 184-4 where the receiver enables the antenna.

Returning to FIG. 9A, the process continues at Step 186 where the receiver adjusts a digital portion of the receiver based on the fine DC offset. At this point, the receiver is ready to receive a burst of data.

Figure 10:
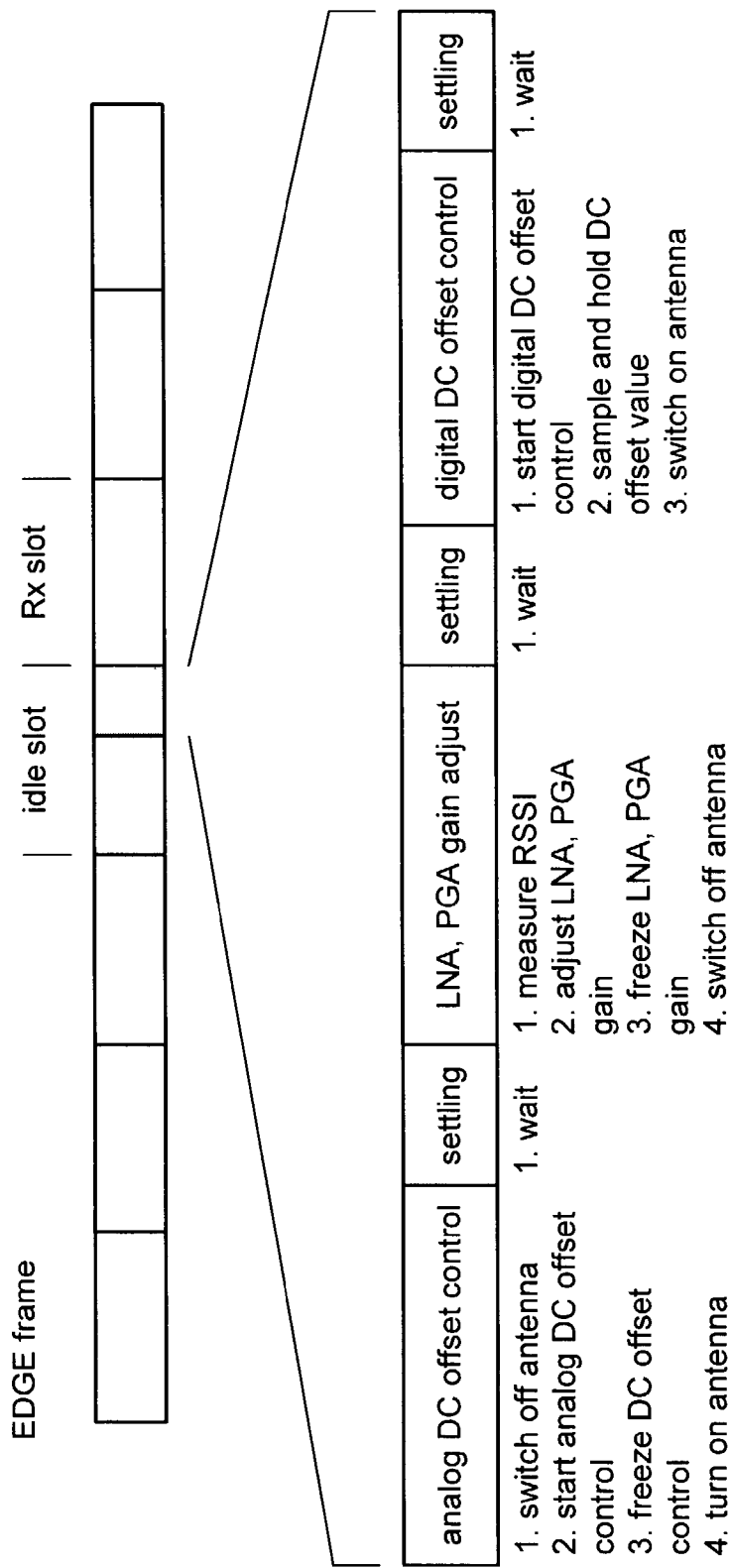
FIG. 10 is a graphical representation of DC offset correction in a receiver in accordance with the present invention.

FIG. 10 is a graphical representation of DC offset correction in a direct conversion or very low intermediate frequency receiver in accordance with the present invention. As shown, an idle slot, e.g., for an EDGE frame, proceeds a receive slot. During the idle slot, the receiver performs an analog DC offset control function, gain adjust function and digital DC offset control function. The analog DC offset control function includes switching off the antenna, starting the analog DC offset control process to determine the DC offset caused by self-mixing of the $1^{st}$ and $2^{nd}$ mixers, once the DC offset value is obtained, this value is stored and the antenna is enabled.

After a settling time, the gain of the low noise amplifier and/or programmable gain amplifier are set. This may be done by measuring the receive signal strength indication of an incoming signal during the idle slot. Based on the measured RSSI, the gain of the low noise amplifier and programmable gain amplifier is determined. The low noise amplifier and/or programmable gain amplifier are set based on this determined gain and the antenna is switched off.

After waiting a settling time, the receiver performs the digital DC offset control function by sampling the residual DC offset and storing the residual DC offset. The receiver then enables the antenna and waits a settling period prior to the received slot where a valid incoming burst of data will be received.

The preceding discussion has presented a method and apparatus for DC offset correction in a direct conversion and/or very low intermediate frequency receiver. By performing a coarse and a fine DC offset correction, residual DC offset is substantially reduced and removal of DC components of the incoming signal is substantially avoided. As one of average skill in the art will appreciate, other embodiments may be derived from the teaching of the present invention, without deviating from the scope of the claims.

What is claimed is:

1. A method for DC offset correction in a direct conversion or very low intermediate frequency (VLIF) receiver, the method comprises:
    prior to receiving a burst of data:
       determining a coarse DC offset with an antenna of the receiver off;
       adjusting an analog portion of the receiver based on the coarse DC offset;
       determining gain setting of the receiver with the antenna on;
       setting gain of at least one gain stage of the receiver based on the gain setting;
       determining a fine DC offset with the antenna off; and
    while receiving the burst of data, subtracting the fine DC offset from a digital baseband signal or digital low IF signal.

2. The method of claim 1, wherein the determining the coarse DC offset further comprises:
    switching off the antenna;
    sampling offsets of the analog portion of the receiver; and
    holding the offsets of the analog portion of the receiver as the coarse DC offset.

3. The method of claim 2, wherein the sampling further comprises:
    setting gain of a low noise amplifier of the analog portion and gain a programmable gain amplifier of the analog portion to a default gain setting.

4. The method of claim 1, wherein the determining the gain setting of the receiver further comprises:
    measuring a received signal strength indication (RSSI) with the antenna on; and
    establishing the gain setting based on the RSSI.

5. The method of claim 4, wherein the adjusting the gain of the at least one gain stage of the receiver further comprises:
    adjusting gain of a low noise amplifier based on the RSSI; and
    adjusting gain of a programmable gain amplifier based on the RSSI.

6. The method of claim 4, wherein the measuring the RSSI further comprises:
    waiting a settling time after the antenna is enable before measuring the RSSI.

7. The method of claim 1, wherein the determining the fine DC offset further comprises:
    measuring a residual DC offset via a low corner frequency digital low pass filter; and
    holding the residual DC offset after expiration of a filter settling time as the fine DC offset.

8. The method of claim 7, wherein the measuring the residual DC offset further comprises:
    waiting a predetermined period of time after the antenna has been turned off.

9. The method of claim 7 further comprises:
    enabling the antenna after holding the residual DC offset.

10. A method for DC offset correction in a direct conversion or very low intermediate frequency (VLIF) receiver, the method comprises:
    determining a coarse analog DC offset by:
       disabling an antenna coupled to the receiver;
       sampling an analog DC offset of an analog portion of the receiver; and
       holding the analog DC offset as the coarse analog DC offset;
    adjusting the analog portion of the receiver based on the coarse analog DC offset;
    determining a gain setting for at least one gain stage of the receiver with the antenna enabled;
    adjusting gain of the at least one gain stage based on the gain setting;
    determining a fine digital DC offset; and
    adjusting a digital portion of the receiver based on the fine digital DC offset.

11. The method of claim 10, wherein the determining a gain setting further comprises:
    waiting an antenna enabling settling time;

after expiration of the antenna enabling settling time,
measuring received signal strength indication (RSSI);
establishing the gain setting based on the RSSI; and
disabling the antenna.

12. The method of claim 11, wherein the adjusting gain of the at least one gain stage further comprises:
adjusting gain of a low noise amplifier of the at least one gain stage based on the RSSI; and
adjusting gain of a programmable gain amplifier of the at least one gain stage based on the RSSI.

13. The method of claim 11, wherein the determining a fine digital DC offset further comprises:
waiting the antenna enabling settling time;
after expiration of the antenna enabling settling time, sampling digital DC offset present in the digital portion of the receiver;
holding the sampled digital DC offset as the fine digital DC offset; and
enabling the antenna.

14. A receiver comprises:
processing module; and
memory operably coupled to the processing module, wherein the memory includes operational instructions that cause the processing module to:
prior to receiving a burst of data:
determine a coarse DC offset with an antenna of the receiver off;
adjust an analog portion of the receiver based on the coarse DC offset;
determine gain setting of the receiver with the antenna on;
set gain of at least one gain stage of the receiver based on the gain setting;
determine a fine DC offset with the antenna off; and
while receiving the burst of data, subtract the fine DC offset from a digital baseband signal or a digital low IF signal.

15. The receiver of claim 14, wherein the memory further comprises operational instructions that cause the processing module to determine the coarse DC offset by:
switching off the antenna;
sampling offsets of the analog portion of the receiver; and
holding the offsets of the analog portion of the receiver as the coarse DC offset.

16. The receiver of claim 15, wherein the memory further comprises operational instructions that cause the processing module to sample the offsets of the analog portion by:
setting gain of a low noise amplifier of the analog portion and gain a programmable gain amplifier of the analog portion to a default gain setting.

17. The receiver of claim 14, wherein the memory further comprises operational instructions that cause the processing module to determine the gain setting of the receiver by:
measuring a received signal strength indication (RSSI) with the antenna on; and
establishing the gain setting based on the RSSI.

18. The receiver of claim 17, wherein the memory further comprises operational instructions that cause the processing module to adjust the gain of the at least one gain stage of the receiver by:
adjusting gain of a low noise amplifier based on the RSSI; and
adjusting gain of a programmable gain amplifier based on the RSSI.

19. The receiver of claim 17, wherein the memory further comprises operational instructions that cause the processing module to measure the RSSI by:
waiting a settling time after the antenna is enable before measuring the RSSI.

20. The receiver of claim 14, wherein the memory further comprises operational instructions that cause the processing module to determine the fine DC offset by:
measuring a residual DC offset via a low corner frequency digital low pass filter; and
holding the residual DC offset after expiration of a filter settling time as the fine DC offset.

21. The receiver of claim 20, wherein the memory further comprises operational instructions that cause the processing module to measure the residual DC offset by:
waiting a predetermined period of time after the antenna has been turned off.

22. The receiver of claim 20, wherein the memory further comprises operational instructions that cause the processing module to:
enable the antenna after holding the residual DC offset.

23. A receiver comprises:
processing module; and
memory operably coupled to the processing module, wherein the memory includes operational instructions that cause the processing module to:
determine a coarse analog DC offset by;
disabling an antenna coupled to the receiver;
sampling analog DC offset of an analog portion of the receiver; and
holding the analog DC offset as the coarse analog DC offset;
adjust the analog portion of the receiver based on the coarse analog DC offset;
determine a gain setting for at least one gain stage of the receiver;
adjust gain of the at least one gain stage based on the gain setting;
determine a fine digital DC offset; and
adjust a digital portion of the receiver based on the fine digital DC offset.

24. The receiver of claim 23, wherein the memory further comprises operational instructions that cause the processing module to determine a gain setting by:
waiting an antenna enabling settling time;
after expiration of the antenna enabling settling time, measuring received signal strength indication (RSSI);
establishing the gain setting based on the RSSI; and
disabling the antenna.

25. The receiver of claim 24, wherein the memory further comprises operational instructions that cause the processing module to adjust gain of the at least one gain stage by:
adjusting gain of a low noise amplifier of the at least one gain stage based on the RSSI; and
adjusting gain of a programmable gain amplifier of the at least one gain stage based on the RSSI.

26. The receiver of claim 24, the memory further comprises operational instructions that cause the processing module to determine a fine digital DC offset by:
waiting the antenna enabling settling time;
after expiration of the antenna enabling settling time, sampling digital DC offset present in the digital portion of the receiver;
holding the sampled digital DC offset as the fine digital DC offset; and
enabling the antenna.

* * * * *